United States Patent Office 3,408,745
Patented Nov. 5, 1968

3,408,745
METHODS OF AND MEANS FOR PRODUCING ANHYDROUS ALUMINA
Luigi Filippi, Porto Marghera, Veneto, and Hans Dinner, Mogliano Veneto, Treviso, Italy, assignors to Swiss Aluminium Ltd., Chippis, Switzerland, a corporation of Switzerland
Continuation of application Ser. No. 349,693, Mar. 5, 1964. This application Aug. 23, 1966, Ser. No. 574,472
Claims priority, application Switzerland, Mar. 7, 1963, 2,886/63
4 Claims. (Cl. 34—10)

ABSTRACT OF THE DISCLOSURE

In producing anhydrous alumina from moist hydrate of alumina, the hot waste gases of a revolving calcination oven are conducted to the upper part of a drier, moist hydrate of alumina is charged also into the upper part of the drier, and in the lower part of the drier the hydrate is agitated by agitators and thrown thereby repeatedly upwardly into the gas stream, and then the hydrate and fine particles are separated from the gases and conveyed into the oven.

---

This application is a continuation of application Ser. No. 349,693, filed Mar. 5, 1964, now abandoned.

The invention relates to the production of anhydrous alumina, and relates more particularly to methods of producing anhydrous alumina from moist hydrate of alumina (aluminum hydroxide, $Al(OH)_3$), and to means for carrying out these methods.

Industrially, anhydrous alumina is usually gained from the mineral bauxite by alkaline decomposition by means of the so-called "Bayer"-process. After filtering and washing, there is obtained a hydrate which generally contains about from 10 to 15 percent free moisture (water not bound chemically). The conversion of this product into anhydrous alumina thus comprises the following steps: Heating of the hydrate, separating of the free moisture or drying, separating the chemically bound water, and recrystallization of the anhydrous product or the calcination proper; these different steps need not necessarily be taken in this sequence.

Generally, the calcination of the hydrates of alumina today is carried out in a counter current process in revolving roasting calcination ovens; at one end of the oven the cold and moist material is usually poured in, while at the other end the fuel (crude oil, gas or the like) is supplied which produces the heat necessary for the calcination.

Nowadays there is the tendency greatly to increase the production of revolving roasting calcination ovens; this leads naturally to a rise in the exit temperature of the waste gases of the oven. Temperatures of from 300° C. to 400° C. are thus obtained, instead of from 250° C. to 300° C. that had prevailed in the past. This is primarily the case with ovens that were built several years ago, and which are usually too short for today's requirements. As in most instances, and for different reasons, it is impossible to increase the length of the existing ovens, one is forced to find other methods to regain the heat contained in the waste gases. For instance, heat exchangers were installed which permitted pre-heating of the air that was supplied to the oven; but this solution is limited in its effectiveness.

On the other hand, it has been proposed to pre-dry the moist hydrate in a counter current process by means of cyclones which are arranged at the entrance to the revolving roasting oven and which are heated by the waste gases that exit from the oven. As the moist hydrate has, however, the tendency to conglomerate into more or less large lumps, the heat exchange in accordance with this principle is inefficient. In addition, the apparatus necessary for this proposed pre-drying process is very large.

It is accordingly among the principal objects of the invention to avoid the inadequacies of the methods of the prior art.

It is another object of the invention to pre-dry the moist hydrate of alumina in a parallel current drier prior to the calcination in the revolving roasting oven utilizing the waste gases of the oven and mechanically agitating the hydrate in the gas stream, thereafter separating it from the gas and delivering it while still hot into the oven.

It is still another object of the invention to provide an apparatus for this method which may include one or more of the following: A parallel current drier which is arranged upstream of the entrance of the revolving roasting oven, the drier receiving the waste gases from the oven and having means for feeding the moist hydrate of alumina; the drier has in its lower part a rotating shaft with beaters in order to mix the hydrate into the gas stream. The drier has, furthermore, in its lower part on its other end or nearby, a discharge hopper for emptying the coarse granular particles of the dried hydrate, and an exhaust tube for the exit of the gases and of the lighter particles of the dried hydrate carried along by the gases, which are fed through a conduit into a cyclone where the fine hydrate particles are separated from the gases.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

For a fuller understanding of the nature and objects of the invention, reference should be had to the following detailed description, taken in connection with the accompanying drawings, in which.

Figure 1:
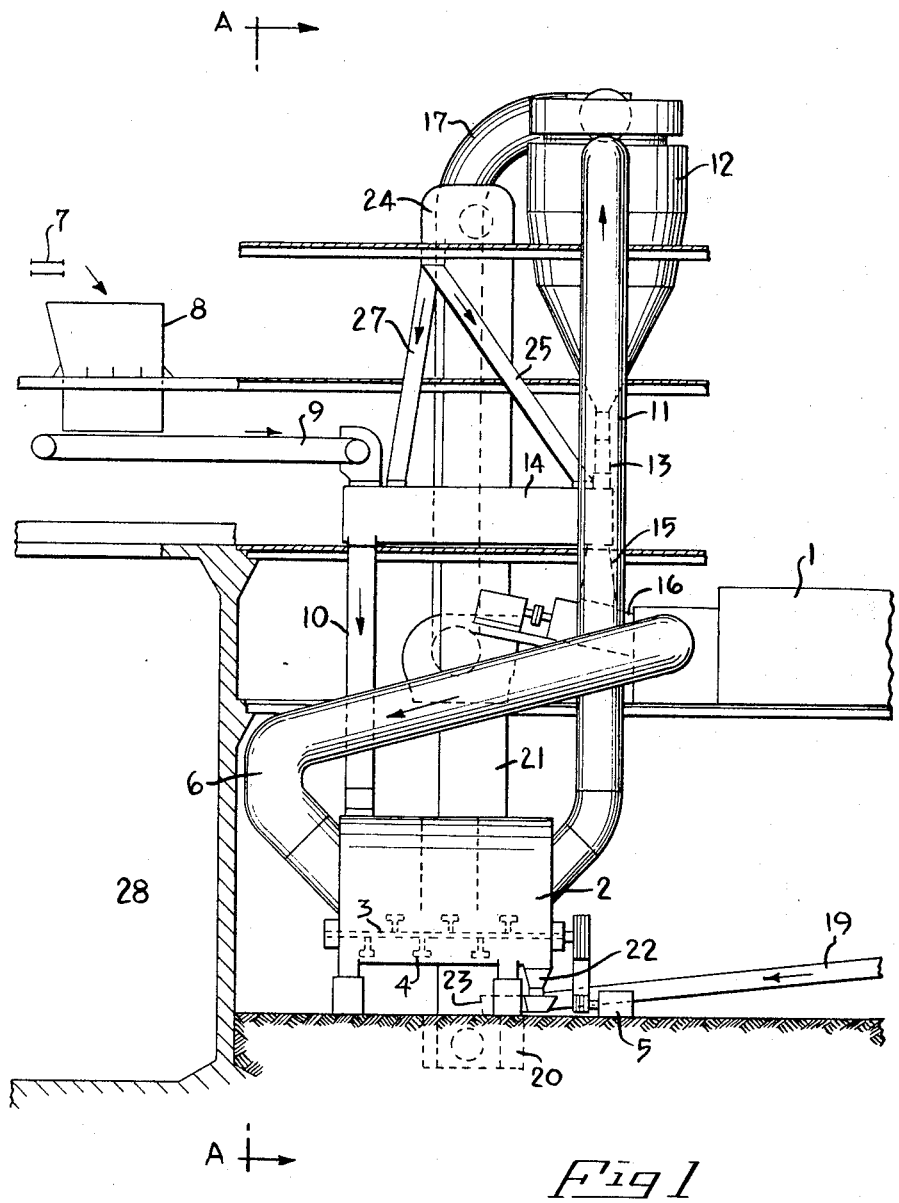
FIG. 1 is a side elevational view of an apparatus in accordance with the invention, adapted to carry out the instant process.
Figure 2:
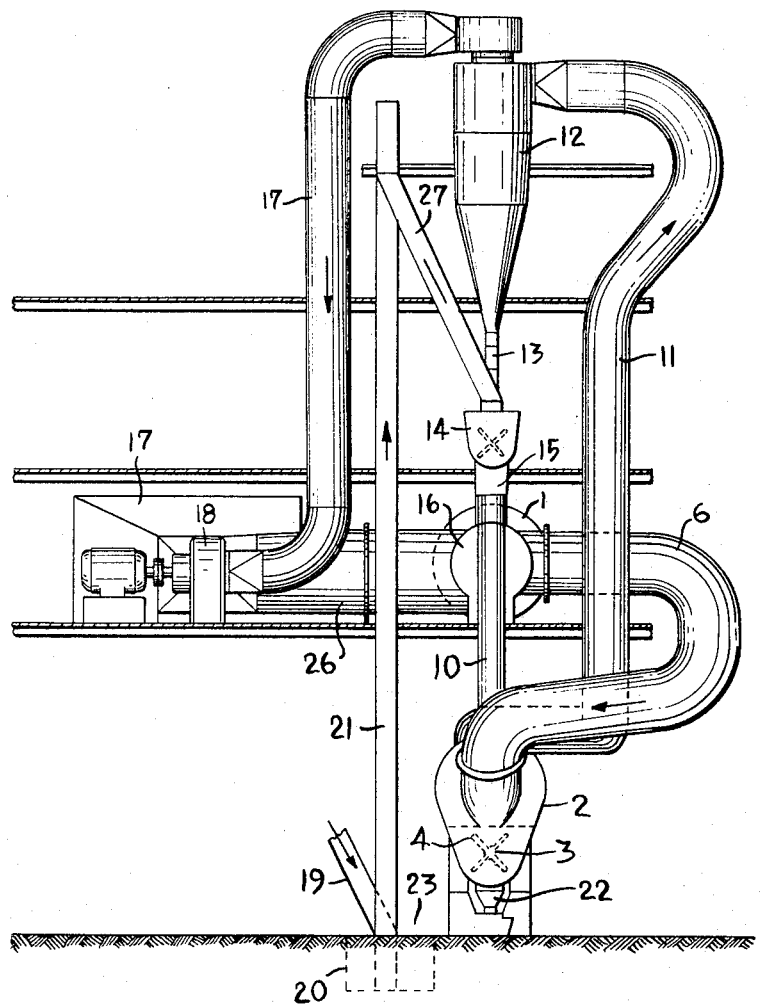
FIG. 2 is a front elevational view thereof, taken on the line A—A of FIG. 1.
Figure 3:
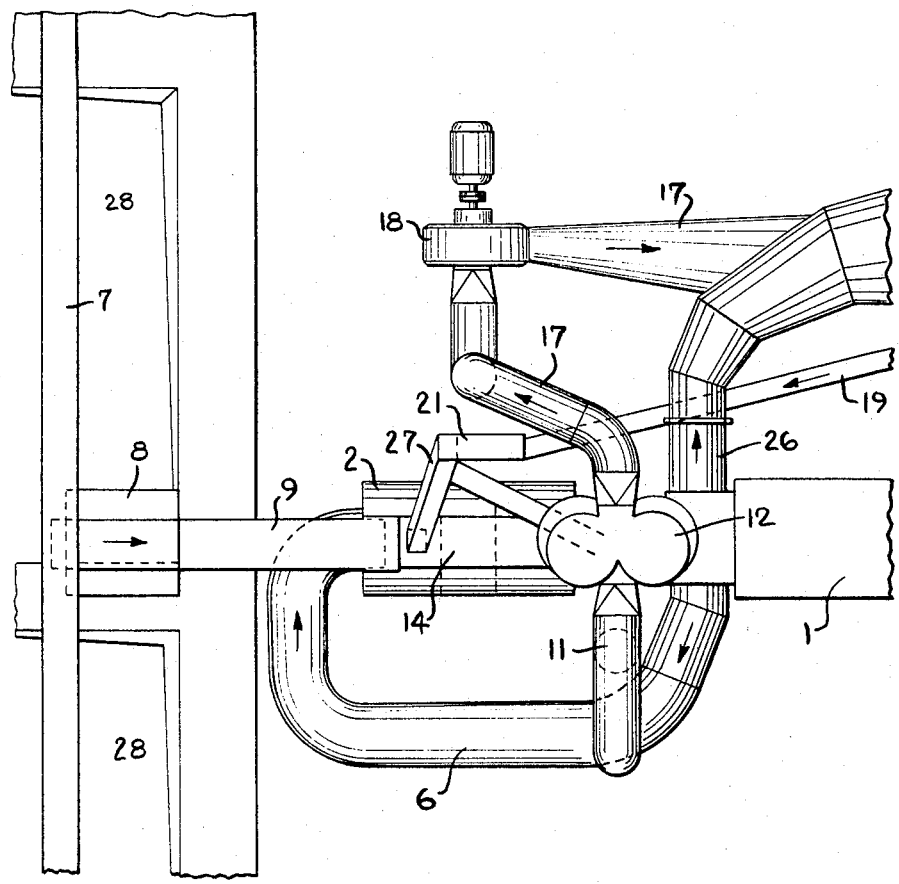
FIG. 3 is a schematic plan view showing the installation of the apparatus.

In carrying the invention into effect in one of the embodiments which has been selected for illustration in the accompanying drawings and for description in this specification, and referring now particularly to FIGS. 1 and 2, there is provided a revolving roasting oven 1. At the entrance side of the oven 1 there is provided a parallel current drier 2 which is designed to pre-dry the moist hydrate of alumina. The drier 2 comprises a housing made of welded steel sheet having a pear-shaped vertical cross-section with a fireproof insulation. The drier 2 is provided in its lower part with an agitating shaft 3 that carries a plurality of agitators or beaters 4. The shaft 3 is driven by an electric motor 5 and has the function to throw up and whirl around the material to be dried in the hot gas stream. The drier 2 is connected with the exit opening for the hot gases of the revolving oven 1 by means of a conduit, such as a pipe line 6 which adjoins one of the frontal sides of the drier 2.

The hydrate of alumina that exits from the filters contains a free moisture of from 10 to 15 percent and reaches the apparatus on a conveyor 7. The conveyor 7 empties the hydrate into a funnel 8 where it is taken over by another conveyor 9, the speed of which regulates the supply of the hydrate to the drier 2. The conveyor 9 conveys the hydrate into a vertical pipe line 10 that is connected to the drier 2 near the conduit for the hot gases. In this manner the moist hydrate reaches the hot gas stream and subsequently is carried thereby to the exit of the drier 2. The mass of moist hydrate, as well as the largest and heaviest particles thereof fall repeatedly to the bottom of the drier 2, from where they are thrown upwards into the hot gas stream by the agitating shaft 3. Under the beating action of the beaters 4 these particles are often broken again into smaller fragments. Thus the hydrate is freed in the drier 2 of a large extent of its free moisture (water not chemically bound) so that the contents of such moisture sinks below 5 percent, preferably below 3 percent.

Upon the exit from the drier 2, the dried hydrate may follow two different paths:

Firstly, the lightest hydrate particles are pulled along by the gas stream through a gas discharge conduit 11 which leads to a cyclone 12 where there takes place a first separation of the solid particles from the gas. The separated fine hydrate will collect near the bottom of the cyclone 12 and will be fed through a conduit 13 to the rear end of a collector 14; from the collector 14 the fine hydrate is fed by the guide 15 to an Archimedean spiral feed conveyor 16 which assures the regular supply to the revolving roasting oven 1.

The very fine particles remain suspended in the gases which emanate from the cyclone and are fed with them through a pipe line 17 to a further battery of cyclones or electrostatic filters (not shown in the drawings); the latter assure the final filtering of the very fine hydrate dust particles out of the gases, whereupon the gases are discharged into the atmosphere. The gases are speeded up on their path by a ventilator 18 that is built into the pipe line 17. The hydrate dust that has been filtered out of the gases will be conveyed by the pipe line 17 into a pit 20 which is disposed at the foot of an elevator 21, about which more will be said hereinbelow.

Secondly, the heaviest hydrate particles which, due to their heavy weight are not carried along by the gas stream, upon exiting from the drier 2, will fall through a discharge hopper 22, and thence move downwardly on a slide 23 into the pit 20 at the foot of the elevator 21, where the heavy hydrate particles will mix with the aforesaid dustlike hydrate particles.

The elevator 21 which may, for instance, be the bucket type, conveys the mixture of coarse and fine hydrate particles to an upper funnel 24 from where the material descends on a slide 25 into the collector 14; thence it is led together with the fine particles coming from the cyclone 12 to the feed conveyor 16 of the revolving roasting oven 1.

In order to disconnect the drier 2, for instance for repair, without necessity to disrupt the operation of the oven 1, the collector 14 extends under the end of the conveyor band 9; this permits that the moist hydrate may directly be fed by this conveyor band 9 to the spiral feed conveyor 16 of the oven 1. Furthermore, the draining of the gases from the oven is done in this case through a pipe line 26 which feeds it directly to the dust filters; thereupon the dust is fed downwardly on the slide 19, raised by the elevator 21 and descends through a fall tube 27 to the entrance of the collector 14. If for reasons of heat technology or because of the speed of the gas circulation it be not feasible to lead all the waste gases through the drier 2, it is possible by means of a slide valve (not shown) to convey only a part of the hot gases to the drier 2 and to discharge the reminder through the pipe line 26.

It is advantageous to provide in the immediate vicinity of the apparatus two containers 28 for the moist hydrate. These containers serve to balance temporary differences in quantity between the production of hydrate and the calcination requirements.

Generally it is estimated that from 50 percent to 85 percent of the dried hydrate are carried by the gas stream from the drier 2 in the direction towards the cyclone 12, while from 15 percent to 50 percent of the dried hydrate go through the hopper 22 and are conveyed upwards by the elevator 21. These figures are, however, only indications, as numerous factors may influence the distribution, as for instance the following: Grain size and grain structure of the hydrate particles, water contents of the hydrate when entering and, respectively, leaving the drier 2, temperature and speed of the drying gases in the drier and in the ascending conduit 11.

The process and apparatus in accordance with the invention offer the advantage of a good recovery of the heat contained in the waste gases of the oven 1. Due to the intensive upheaval caused in the drier 2 by the agitating shaft 3, the heat exchange between the hot gases and the moist hydrate takes place very rapidly. At equal quantity of heat which is fed to the oven 1 by the fuel, the process and apparatus in accordance with the invention increase the production of the oven from 10 percent to 15 percent. The quantity of heat saved in this manner amounts to of from 100 kcal. to 200 kcal. per kg. (kilogram) of calcinated alumina, depending on the temperature of the waste gases. The arrangement of the drier in the path of the waste gases of the oven, which gases always carry with them a considerable amount of fine particles of hydrate or alumina, offers furthermore the advantage that these particles mix with the moist hydrate in the drier and that thus a considerable amount of these particles will be retained.

In addition, the apparatus in accordance with the invention, due to its comparably small volume, offers the advantage of being able to be placed without difficulties at the entrance side of an existing revolving roasting oven. But even in the case of a completely new installation, it will be more economical to combine in accordance with the invention a comparatively short oven with a drier including an agitator, instead of a very long oven. In fact, at the entrance of a revolving roasting oven the conditions of heat exchange between the hot gases and the moist hydrate in lump form is never as favorable as the conditions in the drier with an agitator, where a more intense mixing of the moist material and the hot gases takes place.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a method of producing anhydrous alumina from moist hydrate of alumina with the aid of an apparatus having a revolving roasting calcination oven discharging hot waste gases and a parallel current drier having upper and lower intercommunicating parts, the steps comprising, conducting said hot waste gases carrying a considerable amount of hot, dry fine particles from the oven to and through the upper part of said drier, charging moist hydrate of alumina into said drier near the entry therein of said hot waste gases, whereby said hydrate will be predried by said hot gases and hot fine particles and will thence descend into the lower part of said drier, actively agitating said hydrate in said lower part of the drier thereby throwing repeatedly hydrate particles into said hot gases streaming with said fine particles in the upper part of the drier, and thereafter separating the hydrate and fine particles from the gases and conveying the hydrate and fine particles while still hot into the oven.

2. In a method, as claimed in claim 1, said separating of said hydrate being carried out separately for the heavy particles and for the other particles carried by the gas stream, all of said particles thereafter being united for being conveyed into said oven.

3. In an apparatus for producing anhydrous alumina from moist hydrate of alumina, the combination of a revolving calcination oven developing hot waste gases, and a parallel current drier having upper and lower intercommunicating parts, conduit means establishing interior intercommunication between said oven and said drier and being operable for conducting said hot waste gases and a considerable amount of hot, dry fine particles from the oven to and streaming through the upper part of said drier, agitators disposed entirely in the lower part of said drier, conveyor means operable to convey a charge of moist hydrate of alumina into the upper part of said drier near the entry therein of said hot waste gases, whereby said hydrate will be pre-dried by said hot gases and hot fine particles and will thence descend into the lower part of said drier, said agitators agitating said hydrate and throwing repeatedly hydrate particles into said hot waste gases streaming with said fine particles in the upper part of said drier, means operable for conducting said gases out of said drier, and separating means operative for subsequently separating the hydrate and fine particles from the gases and conveying the hydrate and fine particles while still hot into the oven.

4. In an apparatus, as claimed in claim 3, said separating means comprising near said drier a hopper for the collection of the heavy dry particles from the drier, a conduit for the gases carrying the other particles, a cyclone for the separation of the other particles from the gases, and means operable for collecting all of said particles and conveying them together into said oven.

References Cited

UNITED STATES PATENTS

| | | | |
|---|---|---|---|
| 2,797,077 | 6/1957 | Muller | 263—32 |
| 2,863,225 | 12/1958 | Prussing et al. | 34—68 |

FOREIGN PATENTS

| | | |
|---|---|---|
| 570,220 | 2/1959 | Canada. |
| 1,253,318 | 1/1961 | France. |

FREDERICK L. MATTESON, JR., *Primary Examiner.*

R. A. DUA, *Assistant Examiner.*